(12) United States Patent
Shigeta

(10) Patent No.: US 12,493,828 B2
(45) Date of Patent: *Dec. 9, 2025

(54) CHIP RECOGNIZING AND LEARNING SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,003

(22) Filed: Aug. 21, 2023

(65) Prior Publication Data

US 2023/0394362 A1 Dec. 7, 2023

Related U.S. Application Data

(63) Continuation of application No. 15/877,453, filed on Jan. 23, 2018, now abandoned.

(30) Foreign Application Priority Data

Jan. 24, 2017 (JP) .................................. 2017-010188

(51) Int. Cl.
*G06N 20/00* (2019.01)
*G06T 1/00* (2006.01)
(Continued)

(52) U.S. Cl.
CPC ........... *G06N 20/00* (2019.01); *G06T 1/0007* (2013.01); *G06V 20/64* (2022.01); *G07F 1/06* (2013.01);
(Continued)

(58) Field of Classification Search
CPC . G07F 17/3241; G07F 17/3248; G07F 17/322
See application file for complete search history.

(56) References Cited

U.S. PATENT DOCUMENTS 6,186,895 B1 2/2001 Oliver
6,514,140 B1 2/2003 Storch
(Continued)

FOREIGN PATENT DOCUMENTS

AU 2007231813 A1 11/2008
CN 102892472 A 1/2013
(Continued)

OTHER PUBLICATIONS

Korean Office Action dated Jan. 29, 2024 issued in KR Application 10-2023-7045458.
(Continued)

*Primary Examiner* — Raphael Schwartz
(74) *Attorney, Agent, or Firm* — NORTON ROSE FULBRIGHT US LLP

(57) ABSTRACT

A chip recognizing and learning system includes: a game recording device configured to record a state of chips piled up on a gaming table as an image by a camera; a chip determining device including an artificial intelligence device configured to analyze the recorded image of the state of the chips to determine the numbers and kinds of chips bet by a player; and a teaching device configured to input, in a case where it is determined that there is a doubt for an error in a determining result of the chip determining device, the image used for determination of the chip determining device and the correct numbers and correct kinds of chips for the error as teaching data to the artificial intelligence device to allow the artificial intelligence device to perform learning.

19 Claims, 8 Drawing Sheets

(51) Int. Cl.
  *G06V 20/64* (2022.01)
  *G07F 1/06* (2006.01)
  *G07F 17/32* (2006.01)
  *H04W 4/80* (2018.01)

(52) U.S. Cl.
  CPC ........ *G07F 17/322* (2013.01); *G07F 17/3239* (2013.01); *G07F 17/3241* (2013.01); *G07F 17/3248* (2013.01); *G07F 17/3251* (2013.01); *G07F 17/3293* (2013.01); *H04W 4/80* (2018.02)

(56) References Cited

U.S. PATENT DOCUMENTS

| | | | |
|---|---|---|---|
| 7,419,160 | B1 | 9/2008 | D'Ambrosio |
| 7,938,722 | B2 | 5/2011 | Rowe et al. |
| 2002/0042298 | A1 | 4/2002 | Soltys et al. |
| 2003/0174864 | A1 | 9/2003 | Lindquist |
| 2005/0026680 | A1 | 2/2005 | Gururajan |
| 2005/0051965 | A1 | 3/2005 | Gururajan |
| 2005/0272501 | A1 | 12/2005 | Tran et al. |
| 2006/0160600 | A1 | 7/2006 | Hill et al. |
| 2006/0160608 | A1 | 7/2006 | Hill et al. |
| 2006/0287068 | A1 | 12/2006 | Walker et al. |
| 2007/0077987 | A1 | 4/2007 | Gururajan et al. |
| 2008/0076506 | A1 | 3/2008 | Nguyen et al. |
| 2008/0113783 | A1 | 5/2008 | Czyzewski et al. |
| 2009/0233699 | A1 | 9/2009 | Koyama |
| 2010/0105486 | A1 | 4/2010 | Shigeta |
| 2011/0052049 | A1 | 3/2011 | Rajaraman et al. |
| 2012/0252564 | A1 | 10/2012 | Moore et al. |
| 2016/0328604 | A1 | 11/2016 | Bulzacki |
| 2017/0161987 | A1 | 6/2017 | Bulzacki et al. |
| 2019/0130700 | A1 | 5/2019 | Oguchi et al. |
| 2019/0147689 | A1 | 5/2019 | Shigeta |

FOREIGN PATENT DOCUMENTS

| | | |
|---|---|---|
| CN | 105989334 A | 10/2016 |
| JP | 2009066173 A | 4/2009 |
| JP | 2009-219588 A | 10/2009 |
| JP | 2012-174222 A | 9/2012 |
| JP | 2016-143353 A | 8/2016 |
| JP | 6049118 B1 | 12/2016 |
| KR | 1020140139466 A | 12/2014 |
| WO | 2008120749 A1 | 10/2008 |
| WO | 2015107902 A1 | 7/2015 |
| WO | 2016191856 A1 | 12/2016 |

OTHER PUBLICATIONS

International Search Report dated Apr. 17, 2018 issued in corresponding PCT Application PCT/JP2018/001172.
EP Search Report dated Apr. 10, 2018 corresponding EP Application No. 18152727.6.
Invention Publication dated Aug. 20, 2018 issued in PH Application 1/2018/000022.
Chinese Office Action dated Apr. 2, 2021 issued in CN application 201880008195.0.
Chinese Office Action dated Aug. 5, 2022 issued in CN application 201810063498.4.
Korean Office Action dated Aug. 18, 2022 issued in KR application 10-2019-7022024.
Japanese Office Action dated Nov. 8, 2022 issued in JP application 2018-564513.
Filipino Office Action dated Mar. 30, 2023 issued in PH Application 1-2018-000022.
Chinese Office Action dated Apr. 29, 2023 issued in PH Application 201810063498.4.
Srivastava, TAvish, Introduction to Online Machine Learing: Simplified, Jan. 27, 2015, https://www.analyticsvidhya.com/blog/2015/01/introduction-online-machine-learning-simplified-2/.
Online Machine Learning, Jan. 4, 2016, Wikipedia, the free encyclopedia, https://en.wikipedia.org/w/index.php?title=Online_machine_learning&oldid=698209392 (Year: 2016).
Australian Office Action dated Nov. 16, 2023 issued in AU Application 2022279468.
Filipino Office Action dated Feb. 12, 2024 issued in PH Application 1-2023-050437.
Japanese Office Action dated Aug. 20, 2024 issued in JP Application 2023-145172.
Chinese Office Action dated Nov. 27, 2024, issued in CN Application No. 202310004127.X.
Filipino Substantive Examination Report issued on Sep. 3, 2025, issued in PH Application No. 1-2023-050437.

CHIP RECOGNIZING AND LEARNING SYSTEM

CROSS REFERENCE TO RELATED APPLICATIONS

The present application is a continuation of U.S. patent application Ser. No. 15/877,453 filed Jan. 23, 2018, which claims priority to JP Pat. App. No. 2017-010188 filed Jan. 24, 2017, the contents of which are incorporated herein by reference in their entirety.

BACKGROUND

Technical Field

The present invention relates to a chip recognizing and learning system.

Related Art

In a game such as a baccarat game, a customer (player) makes a bet by piling up a plurality of chips on a table. Therefore, it is necessary to accurately recognize the piled up chips. Note that International Publication No. WO2008/120749 discloses an example of chips used in a game.

SUMMARY

An object of the present invention is to provide a chip recognizing and learning system capable of accurately recognizing chips bet by a player.

According to an aspect of the present invention, a chip recognizing and learning system in an amusement place having a gaming table includes: a game recording device configured to record a state of chips piled up on the gaming table as an image by a camera; a chip determining device including an artificial intelligence device configured to analyze the recorded image of the state of the chips to determine the numbers and kinds of chips bet by a player; and a teaching device configured to input, in a case where it is determined that there is a doubt for an error in a determining result of the chip determining device, the image used for the determination of the chip determining device and the correct numbers and correct kinds of the chips for the error as teaching data to the artificial intelligence device to allow the artificial intelligence device to perform learning.

According to such an aspect, in the case where it is determined that there is the doubt for the error in the determining result of the chip determining device, the teaching device inputs the image used for the determination of the chip determining device and the correct numbers and the correct kinds of the chips for the error as the teaching data to the artificial intelligence device to allow the artificial intelligence device to perform the learning. Therefore, the artificial intelligence device can efficiently learn an image pattern for which accuracy of the determination of the chip determining device is relatively low to intensively improve the accuracy of the determination of the chip determining device for the image pattern. This teaching and learning is repeated, such that the chip determining device can accurately recognize the chips bet by the player in whatever state the chips are piled up.

In the chip recognizing and learning system according to an aspect of the present invention, in a case where it is determined that the determining result of the chip determining device is correct, the teaching device may further input the image used for determination of the chip determining device and the numbers and kinds of the chips of the determining result as teaching data to the artificial intelligence device to allow the artificial intelligence device to perform learning.

According to such an aspect, accuracy of the determination can be further improved for an image pattern for which accuracy of the determination of the chip determining device is relatively high as well as the image pattern for which the accuracy of the determination of the chip determining device is relatively low. Therefore, the chip determining device can more accurately recognize the chips bet by the player.

According to an aspect of the present invention, a chip recognizing and learning system in an amusement place having a gaming table includes: a game recording device configured to record a state of chips piled up on the gaming table as an image by a camera; and a chip determining device including an artificial intelligence device configured to analyze the recorded image of the state of the chips to determine the numbers and kinds of chips bet by a player, wherein, in a case where it is determined that there is a doubt for an error in a determining result of the chip determining device, the artificial intelligence device receives and learns the image used for determination of the chip determining device and the correct numbers or correct kinds of the chips for the error, the image and the correct numbers or correct kinds being input as teaching data by a teaching device.

According to such an aspect, in the case where it is determined that there is the doubt for the error in the determining result of the chip determining device, the artificial intelligence device receives and learns the image used for the determination of the chip determining device and the correct numbers or the correct kinds of the chips for the error, which are input as the teaching data by the teaching device. Therefore, the artificial intelligence device can efficiently learn the image pattern for which accuracy of the determination of the chip determining device is relatively low to intensively improve the accuracy of the determination of the chip determining device for the image pattern. By repetition of this, the chip determining device can accurately recognize the chips bet by the player in whatever state the chips are piled up.

According to an aspect of the present invention, the chip recognizing and learning system may further include a control device configured to determine whether or not the determining result of the chip determining device is correct, wherein the chip determining device can determine kinds and the numbers of chips in a chip tray included in the gaming table and positions, kinds, and the number of chips bet by each player in a game performed on the gaming table from the image recorded in the game recording device, and the control device may grasp the actual total amount of the chips in the chip tray when retrieval of all the losing chips bet by each player ends, calculate the necessary total amount of the chips in the chip tray by adding an increased amount of the chip tray in the game calculated from kinds and the numbers of chips bet by a losing player to the total amount of the chips in the chip tray before settlement of each game on the basis of the determining result of the chip determining device, compare the necessary total amount of the chips in the chip tray and the actual total amount of the chips in the chip tray with each other, and determine that there is the doubt for the error in the determining result of the chip determining device when there is a difference between the necessary total amount and the actual total amount.

According to such an aspect, the control device can automatically determine whether or not there is the doubt for the error in the determining result of the chip determining device.

According to an aspect of the present invention, a chip recognizing and learning system in an amusement place having a gaming table includes: a game recording device configured to record a state of chips piled up on the gaming table as an image by a camera; a chip determining device including an artificial intelligence device configured to analyze the recorded image of the state of the chips to determine the numbers and kinds of chips bet by a player; and a teaching device configured to input, in a case where it is determined that the determining result of the chip determining device is correct, the image used for determination of the chip determining device and the numbers and kinds of the chips of a determining result as teaching data to the artificial intelligence device to allow the artificial intelligence device to perform learning.

According to an aspect of the present invention, a chip recognizing and learning system in an amusement place having a gaming table includes: a game recording device configured to record a state of chips piled up on the gaming table as an image by a camera; and a chip determining device including an artificial intelligence device configured to analyze the recorded image of the state of the chips to determine the numbers and kinds of chips bet by a player, wherein, in the case where it is determined that the determining result of the chip determining device is correct, the artificial intelligence device receives and learns the image used for determination of the chip determining device and the numbers or kinds of the chips of a determining result, the image and the numbers or kinds being input as teaching data by a teaching device.

According to an aspect of the present invention, the chip recognizing and learning system further includes a control device configured to determine whether or not the determining result of the chip determining device is correct, wherein the chip determining device can determine kinds and the numbers of chips in a chip tray included in the gaming table and positions, the kinds, and the number of the chips bet by each player in a game performed on the gaming table from the image recorded in the game recording device, and the control device may grasp the actual total amount of the chips in the chip tray when retrieval of all the losing chips bet by each player ends, calculate the necessary total amount of the chips in the chip tray by adding an increased amount of the chip tray in the game calculated from the kinds and the numbers of the chips bet by a losing player to the total amount of the chips in the chip tray before settlement of each game on the basis of the determining result of the chip determining device, compare the necessary total amount of the chips in the chip tray and the actual total amount of the chips in the chip tray with each other, and determine that the determining result of the chip determining device is correct when the necessary total amount coincides with the actual total amount.

In the chip recognizing and learning system according to an aspect of the present invention, the control device may grasp the actual total amount of the chips in the chip tray based on radio frequency identifications (RFIDs) provided in the chips.

According to such an aspect, the control device can automatically grasp the actual total amount of the chips in the chip tray using the RFIDs to improve measurement accuracy as compared with measurement performed with naked eyes of a worker.

In the chip recognizing and learning system according to an aspect of the present invention, the control device may include an artificial intelligence device for deciding a correct answer, which grasps the actual total amount of the chips in the chip tray from the image recorded in the game recording device and is different from the artificial intelligence device of the chip determining device.

According to such an aspect, the control device can automatically grasp the actual total amount of the chips in the chip tray using the artificial intelligence device for deciding a correct answer to improve measurement accuracy as compared with measurement performed with the naked eyes of the worker.

In the chip recognizing and learning system according to an aspect of the present invention, the game recording device may record the image acquired from the camera after giving, to the image, an index or a time, or a tag specifying a retrieval scene or a payment scene of the chips, such that the chip determining device can analyze a record of the game.

According to such an aspect, the chip determining device can easily specify the image of a state of the chips that should be analyzed from recorded contents of the game recording device by using the index, the time, or the tag given to the image to shorten a time required for specifying the image.

In the chip recognizing and learning system according to an aspect of the present invention, the chip determining device may determine the kinds, the numbers, and the positions of the bet chips even when some of a plurality of the chips put on the gaming table are partially or entirely hidden due to a blind spot of the camera.

According to such an aspect, particularly in the case where some of the plurality of the chips put on the gaming table are partially or entirely hidden due to a blind spot of the worker, it is possible to improve the measurement accuracy as compared with the measurement performed with the naked eyes of the worker by allowing the chip determining device to determine the chips bet by the player.

According to an aspect of the present invention, a chip recognizing and learning method in an amusement place having a gaming table includes: a game recording step of recording a state of chips piled up on the gaming table as an image by a camera; a chip determining step of analyzing, by an artificial intelligence device, the recorded image of the state of the chips to determine the numbers and kinds of chips bet by a player; and a teaching step of inputting, in a case where it is determined that there is a doubt for an error in a determining result of the chip determining step, the image used for determination of the chip determining step and the correct numbers and correct kinds of the chips for the error as teaching data to the artificial intelligence device to allow the artificial intelligence device to perform learning.

According to such an aspect, in the case where it is determined that there is the doubt for the error in the determining result of the chip determining step, in the teaching step, the image used for the determination of the chip determining step and the correct numbers and the correct kinds of the chips for the error are input as the teaching data to the artificial intelligence device to allow the artificial intelligence device to perform the learning. Therefore, the artificial intelligence device can efficiently learn an image pattern for which accuracy of the determination of the chip determining step is relatively low to intensively improve the accuracy of the determination for the image pattern. By repeating this, the chips bet by the player can be accurately recognized in whatever state the chips are piled up, in the chip determining step.

According to an aspect of the present invention, a chip recognizing and learning method in an amusement place having a gaming table includes: a game recording step of recording a state of chips piled up on the gaming table as an image by a camera; a chip determining step of analyzing, by an artificial intelligence device, the recorded image of the state of the chips to determine the numbers and kinds of chips bet by a player; and teaching step of inputting, in a case where it is determined that the determining result of the chip determining step is correct, the image used for determination of the chip determining step and the numbers and kinds of the chips of a determining result as teaching data to the artificial intelligence device to allow the artificial intelligence device to perform learning.

DETAILED DESCRIPTION

Figure 1:
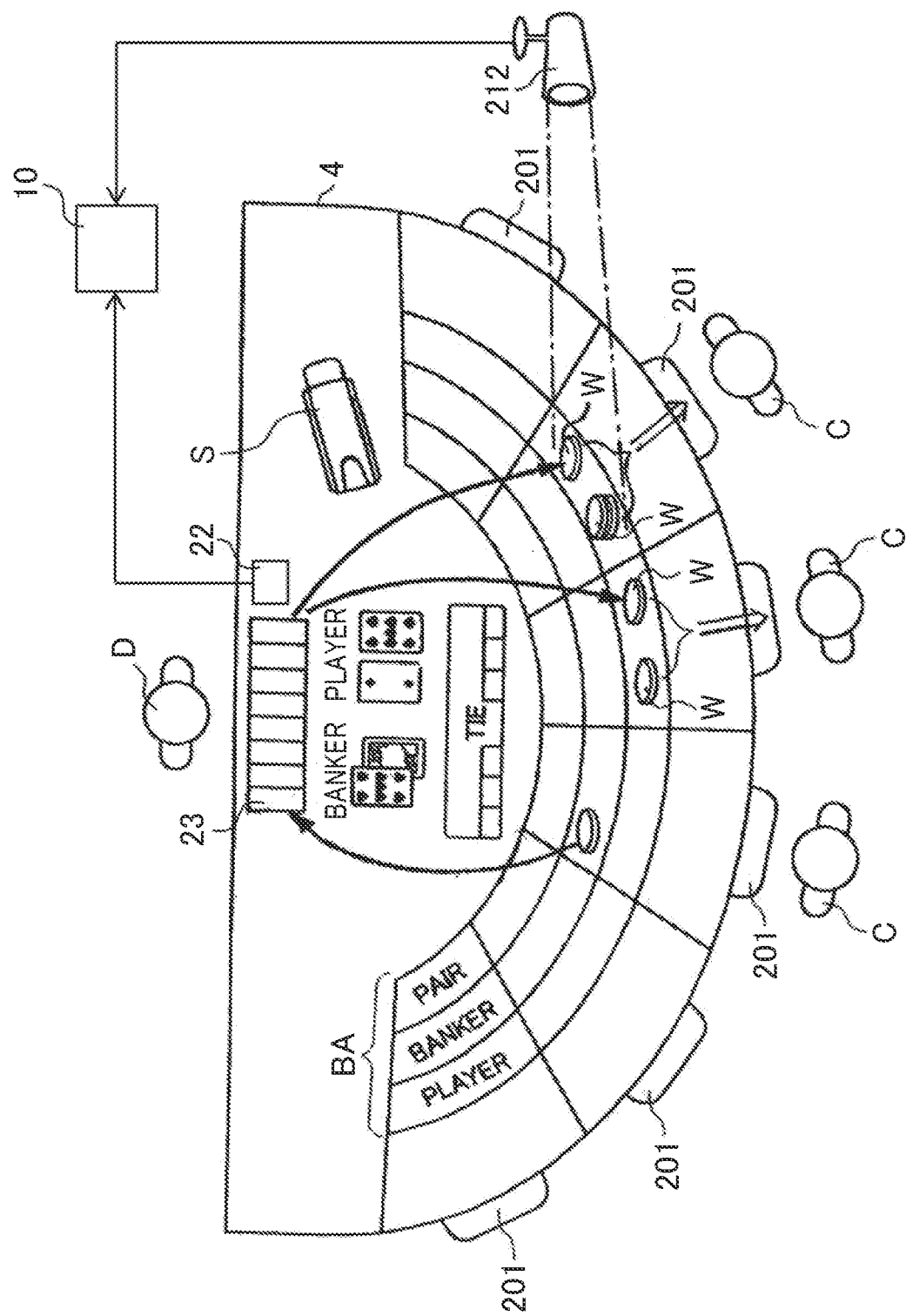
FIG. 1 is a diagram schematically illustrating an amusement place equipped with a chip recognizing and learning system according to a first embodiment.

Hereinafter, embodiments of the present invention will be described in detail with reference to the accompanying drawings. Note that in the respective drawings, the same reference numerals are given to components having the same functions, and a detailed description for components having the same reference numerals is not repeated.

First, a game played in an amusement place having a gaming table 4 will be described. In the present embodiment, an example in which the gaming table 4 is a baccarat table and a baccarat game is played will be described, but the present invention can also be applied to other amusement places or other games.

FIG. 1 is a diagram schematically illustrating an amusement place equipped with a chip recognizing and learning system 10 according to a first embodiment. As illustrated in FIG. 1, in the amusement place, the approximately semicircular gaming table 4 and a plurality of chairs 201 arranged side by side so as to face a dealer D along an arc of the gaming table 4 are disposed. The number of chairs 201 is arbitrary, and in the example illustrated in FIG. 1, six chairs 201 are arranged side by side. In addition, a bet area BA is provided on the gaming table 4 so as to correspond to each of the chairs 201. That is, in the illustrated example, the six bet areas BA are arranged side by side in an arc shape.

As illustrated in FIG. 1, a customer (player) C sits on each of the chairs 201. The customer (player) C makes a bet (hereinafter, referred to as "bet") by disposing chips W to be piled up in the bet area BA provided in front of the chair 201 that the customer (player) sits with respect to whether a player (PLAYER) will win the baccarat game, a banker (BANKER) will win the baccarat game, or the player and the banker will be tied (TIE) with each other as a win/loss result of the baccarat game.

Kinds of the chips W to be bet may be one or plural. In addition, the numbers of the chips W to be bet may be arbitrarily decided by the customer (player) C. The chip recognizing and learning system 10 according to the present embodiment recognizes the numbers and kinds of the chips W disposed to be piled up.

Figure 2:
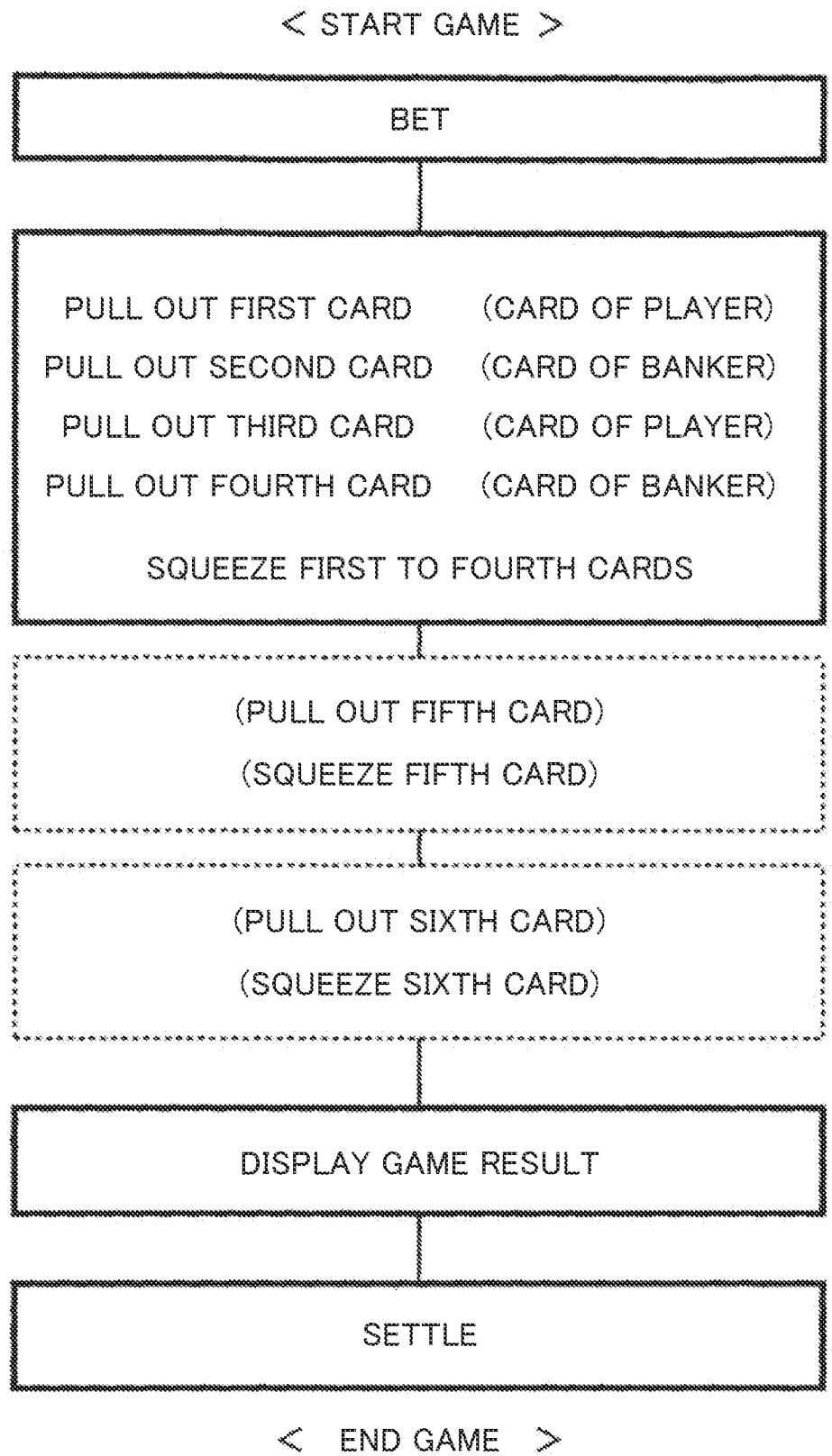
FIG. 2 is a diagram for describing progress of a baccarat game.

In order to end the bet by the customer (player) C, the dealer D measures a timing, calls "No More Bet (end of reception of the bet)", and transversally moves a hand, for example. Then, the dealer D pulls out cards one by one from a card shooter device S to the gaming table 4. As illustrated in FIG. 2, a first card becomes a card of the player (PLAYER), a second card becomes a card of the banker (BANKER), a third card becomes a card of the player (PLAYER), and a fourth card becomes a card of the banker (BANKER) (hereinafter, pulling out the first to fourth cards is referred to as "dealing").

Note that all the cards are pulled out from the card shooter device S with their back surfaces facing upward. For this reason, a rank (number) or a suit (i.e., Heart, Diamond, Spade, Clover) of the pulled out cards cannot be grasped from either of the dealer D or the customer (player) C.

After the fourth card is pulled out, a customer (player) C making a bet on the player (PLAYER) (a customer C making the highest bet in a case where the number of customers making a bet on the PLAYER is plural, or the dealer D in a case where a customer making a bet on the PLAYER does not exist) overturns the first and third cards with the back surfaces facing upward. Likewise, a customer (player) C making a bet on the banker (BANKER) (a player C making the highest bet in a case where the number of customers making a bet on the BANKER is plural, or the dealer D in a case where a customer making a bet on the BANKER does not exist) overturns the second and fourth cards (in general, overturning the cards with the back surfaces facing upward is referred to as "squeeze").

Then, a fifth card and a sixth card are pulled out by the dealer D on the basis of the rank (number) of the first to fourth cards and a detailed rule of the baccarat game, and each of the fifth card and a sixth card becomes a card of the player (PLAYER) or the banker (BANKER). Likewise, the customer (player) C making a bet on the player (PLAYER) squeezes the card becoming the card of the player (PLAYER), and the customer (player) making a bet on the banker (BANKER) squeezes the card becoming the card of the banker (BANKER).

A time required after the first to fourth cards are pulled out and the fifth and sixth cards are squeezed until a win/loss result is found is a time attractive to the customer (player) C.

Further, depending on the rank (number) of the cards, win/loss may be determined in the first to fourth cards, or may be determined in the fifth card or the sixth card. The dealer D grasps whether or not the win/loss is determined or the win/loss result on the basis of the rank (number) of the squeezed cards, and presses a win/loss result display button on the card shooter device S to perform an operation such as displaying the win/loss result on a monitor in order to inform the customer (player) C of the win/loss result.

At the same time, the win/loss result of the game is determined by a win/loss determining unit of the card shooter device S. In a case where the dealer D attempts to pull out a card without displaying the win/loss result even though the win/loss has been determined, it becomes an error. The card shooter device S detects the error, and outputs an error signal. Finally, the dealer D performs settlement on stakes by the customers (players) C during a period in which the win/loss result is displayed, and pays the stakes to a winning customer (player) C and retrieves the stakes from a losing customer (player) C. After the settlement is completed, the display of the win/loss result ends, and a bet of the next game starts.

A flow of the baccarat game is widely performed in a general casino, and the card shooter device S is an existing card shooter device having a structure in which the cards are pulled out with a hand of the dealer D, configured to read out the pulled-out cards, and having a result display button or a result display unit to have a function of performing determination of win/loss or display of a win/loss result. In a general casino floor, the card shooter device S, the monitor, and the like are disposed in each of a plurality of gaming tables 4 arranged side by side, and cards to be used are supplied and operated in a package or set unit or a carton unit to each gaming table 4 or a cabinet disposed below each gaming table 4.

The chip recognizing and learning system 10 according to the present embodiment relates to a system for recognizing and learning the chips W disposed to be piled up in the bet area BA by the customer (the player) C, and more particularly to a system for recognizing and learning the numbers and/or kinds of the chips W.

As illustrated in FIG. 1, in the present embodiment, a monitoring camera 212 capturing an image of a state of the chips W disposed to be piled up in the bet area BA is provided outside the gaming table 4. In addition, each chip W is provided with a radio frequency identification (RFID), and a chip tray 23 managed by the dealer D is provided with an RFID reading device 22 reading the RFIDs of the chips W in the chip tray 23.

The chip recognizing and learning system 10 according to the present embodiment is communicably connected to each of the monitoring camera 212 and the RFID reading device 22.

Figure 3:
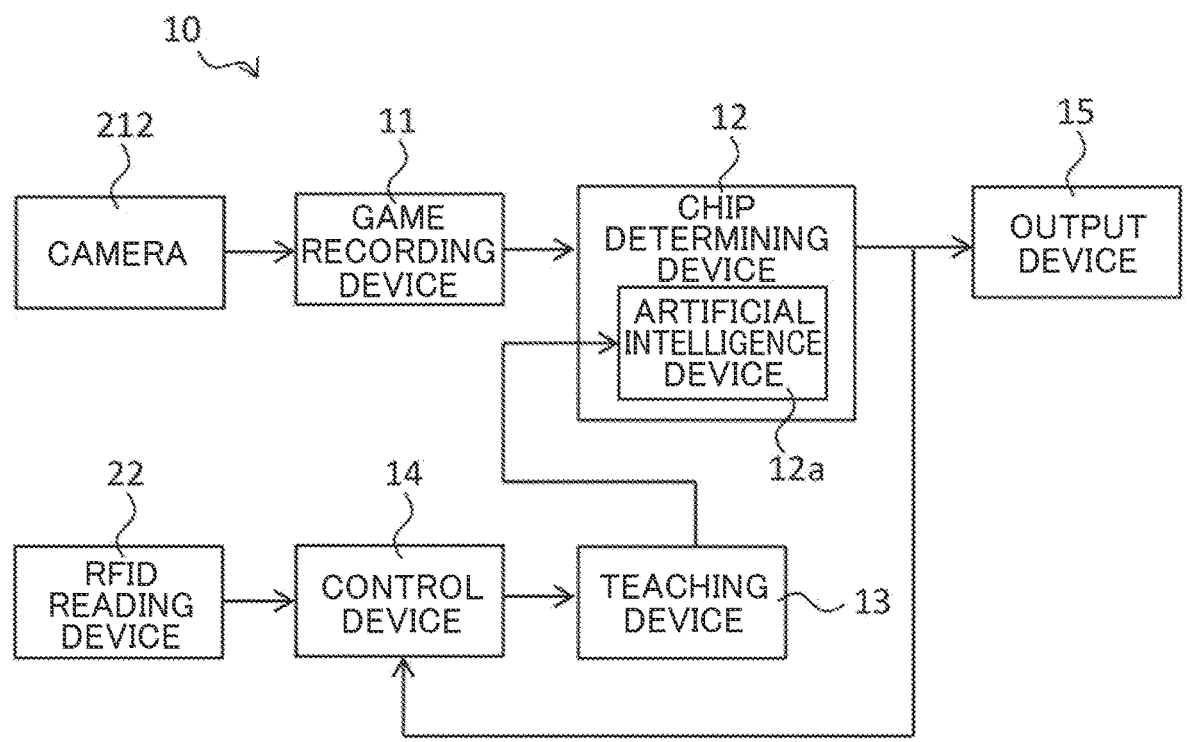
FIG. 3 is a block diagram illustrating a schematic configuration of the chip recognizing and learning system according to the first embodiment.

FIG. 3 is a block diagram illustrating a schematic configuration of the chip recognizing and learning system 10 according to the present embodiment.

As illustrated in FIG. 3, the chip recognizing and learning system 10 has a game recording device 11, a chip determining device 12, a teaching device 13, and a control device 14. Note that at least some components of the chip recognizing and learning system 10 are implemented by a computer.

The game recording device 11 includes a fixed data storage such as a hard disk, for example. The game recording device 11 records the state of the chips W piled up on the gaming table 4 as an image captured by the camera 212. Note that the image may be a moving image or may be a continuous still image.

The game recording device 11 may record the image acquired from the camera 212 after giving, to the image, an index or a time, or a tag specifying a retrieval scene or a payment scene of the chips W, such that the chip determining device 12 to be described below can analyze a record of the game.

The chip determining device 12 includes an artificial intelligence device 12a performing image recognition by, for example, a deep learning technique, and analyzes the image of the state of the chips W recorded in the game recording device 11 to determine the numbers and kinds of the chips W bet by the customers (players) C. The chip determining device 12 may further determine positions in the bet areas BA of the chips W bet by the customers (players) C.

The chip determining device 12 may analyze the image of the state of the chips W recorded in the game recording device 11 to determine the numbers and kinds of the chips W in the chip tray 23 before settlement of each game.

As illustrated in FIG. 3, the chip determining device 12 outputs a determining result to an output device 15. The output device 15 may output the determining result of the chip determining device 12 as text information to the monitor on the gaming table 4 or as audio information to a headset or the like of the dealer D.

The control device 14 is a device determining whether or not the determining result of the chip determining device 12 is correct. The control device 14 grasps the actual total amount V0 of the chips W in the chip tray 23, when retrieval of all the chips W (losing chips) bet by the losing customer (player) C ends.

In the present embodiment, the control device 14 acquires information of the RFIDs of the chips W in the chip tray 23 from the RFID reading device 22, determines kinds and the numbers of the chips W in the chip tray 23 on the basis of the acquired information of the RFIDs, and grasps the actual total amount V0.

In addition, the control device 14 acquires the determining result from the chip determining device 12, and calculates the total amount V1 from the kinds and the numbers of the chips W in the chip tray 23 before the settlement of each game and calculates the total amount (that is, an increased amount in the chip tray 23 in the game) V2 of the chips W bet by the losing player C from the positions, the kinds, and the numbers of the chips W bet by each player C, on the basis of the acquired determining result. Then, the control device 14 adds the increased amount V2 of the chip tray 23 in the game to the total amount V1 of the chips W in the chip tray 23 before the settlement of each game to calculate the necessary total amount V3 (=V1+V2) of the chips in the chip tray 23.

The control device 14 compares the necessary total amount V3 of the chips W in the chip tray 23 and the actual total amount V0 of the chips W in the chip tray 23 with each other, and determines that there is a doubt for an error in the determining result of the chip determining device 12 when there is a difference between the necessary total amount V3 and the actual total amount V0 (V3≠V0). On the other hand, the control device 14 determines that the determining result of the chip determining device 12 is correct when the necessary total amount V3 coincides with the actual total amount V0 (V3=V0).

When the retrieval of the chips W from the losing player C ends, a payment of the chips W to the winning player C is made. The control device 14 calculates the total amount of the chips W bet by the winning player C and an amount V4 that should be paid for the total amount of the chips W bet by the winning player C from the positions, the kinds, and the numbers of the chips W bet by each player C. The control device 14 grasps the actual total amount after being decreased due to the payment of the chips W in the chip tray 23, determines whether or not the actual total amount coincides with the amount V4 that should be paid, and displays a lamp indicating whether or not the actual total amount coincides with the amount V4 depending on a determining result.

The control device 14 compares the necessary total amount V5 (=V1+V2−V4) of the chips W in the chip tray 23 and the actual total amount of the chips W in the chip tray 23 after being increased due to the retrieval of the chips and decreased due to the payment of the chips with each other, and determines that there is a doubt for an error in the determining result of the chip determining device 12 when there is a difference between the necessary total amount V5 and the actual total amount. The control device 14 determines that the determining result of the chip determining device 12 is correct when the necessary total amount V5 coincides with the actual total amount.

With respect to each determination on whether or not the total amounts coincide with each other, for example, when the total amounts coincide with each other, a green lamp may be turned on, and when the total amounts do not coincide with each other, a red lamp may be turned on.

The teaching device 13 acquires information on whether or not the determining result of the chip determining device 12 is correct from the control device 14. In the case where it is determined by the control device 14 that there is the doubt for the error in the determining result of the chip determining device 12, the teaching device 13 may input the image used for the determination (including the doubt for the error) of the chip determining device 12 and the correct numbers and correct kinds of the chips W for the error as teaching data to the artificial intelligence device 12a of the chip determining device 12 to allow the artificial intelligence device 12a to perform learning. Note that a person actually confirms the image to teach the correct numbers and the correct kinds of the chips W for the error to the teaching device 13. That is, the teaching device 13 learns the correct numbers and the correct kinds of the chips W for the error by the teaching of the person through a device teaching an image at the time of the error and the correct numbers of the chips at the time of the error.

When it is determined by the control device 14 that the determining result of the chip determining device 12 is correct, the teaching device 13 may further input an image used for the (correct) determination of the chip determining device 12 and the numbers and kinds of the chips W of the determining result of the chip determining device 12 (that is, the correct numbers and the correct kinds of the chips W) as teaching data to the artificial intelligence device 12a of the chip determining device 12 to allow the artificial intelligence device 12a to perform learning.

The teaching device 13 can improve accuracy of the determination of the chips W by the chip determining device 12 by repeatedly performing a teaching action of inputting the teaching data to the artificial intelligence device 12a of the chip determining device 12 to allow the artificial intelligence device 12a to learn the teaching data. Since the artificial intelligence device 12a of the chip determining device 12 analyzes the image of the state of the chips W to perform the determination of the chips W, even when some of the plurality of the chips W put on the gaming table 4 are partially or entirely hidden due to a blind spot of the camera 212, the artificial intelligence device 12a of the chip determining device 12 can determine kinds, the numbers, and positions of the bet chips W by repeatedly learning such an incomplete image.

Next, an operation (a chip recognizing and learning method) of the chip recognizing and learning system 10 according to the present embodiment will be described with reference to FIG. 4.

Figure 4:
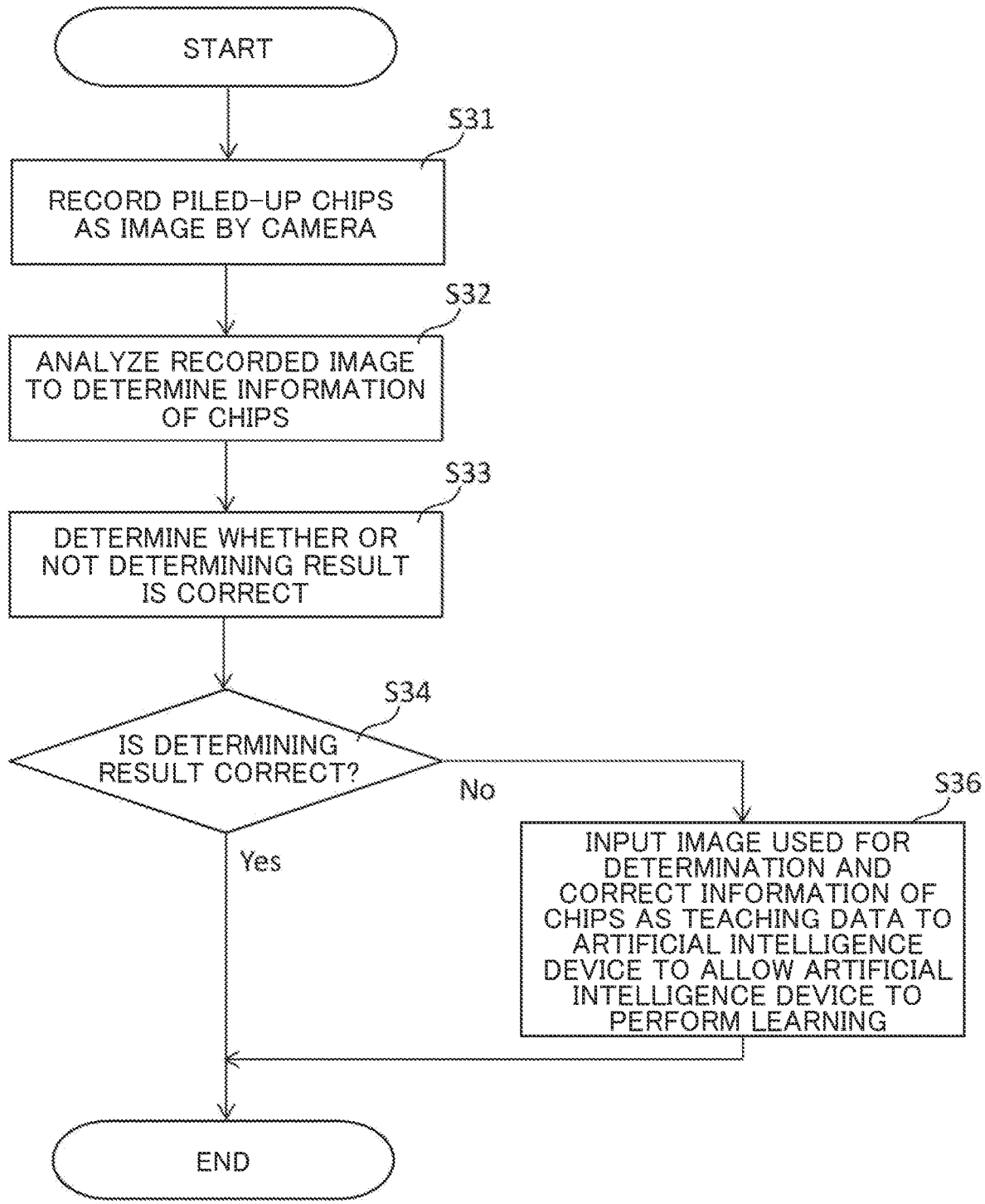
FIG. 4 is a flowchart for describing a chip recognizing and learning method.

As illustrated in FIG. 4, when the customer (player) C disposes the chips W to be piled up in the bet area BA of the gaming table 4 (bets the chips W), the state of the piled-up chips W is captured as the image by the camera 212, and the image is recorded in the game recording device 11 (Step S31).

Then, the image recorded in the game recording device 11 is analyzed by the chip determining device 12, and the numbers and the kinds of the chips W bet by the customer (player) C are determined (Step S32). Note that the image analyzed by the chip determining device 12 may be selected on the basis of the index, the time, or the tag specifying the retrieval scene or the payment scene of the chips W given to the image by the game recording device 11.

In Step S32, by analyzing the image of the state of the chips W recorded in the game recording device 11 by the chip determining device 12, the positions of the chips W bet by the customer (player) C in the bet area BA may be determined as well as the numbers and the kinds of the chips W bet by the customer (player) C, or the numbers and the kinds of the chips W in the chip tray 23 before the settlement of each game may be determined.

The determining result of the chip determining device 12 is output to the output device 15. The determining result of the chip determining device 12 may be output, by the output device 15, as the text information to the monitor on the gaming table 4 or as the audio information to the headset or the like of the dealer D.

The determining result of the chip determining device 12 is also transmitted to the control device 14, and it is determined by the control device 14 whether or not the determining result of the chip determining device 12 is correct (Step S33).

In the case where it is determined by the control device 14 that there is the doubt for the error in the determining result of the chip determining device 12 (No in Step S34), the image used for the determination (including the doubt for the error) of the chip determining device 12 and the correct numbers and the correct kinds of the chips W for the error are input as the teaching data from the teaching device 13 to the artificial intelligence device 12a of the chip determining device 12, and the artificial intelligence device 12a performs the learning (Step S36).

On the other hand, in the case where it is determined by the control device 14 that the determining result of the chip determining device 12 is correct (Yes in Step S34), the operation of the chip recognizing and learning system 10 in the game ends.

As described above, according to the present embodiment, in the case where it is determined that there is the doubt for the error in the determining result of the chip determining device 12, the teaching device 13 inputs the image used for the determination of the chip determining device 12 and the correct numbers and the correct kinds of the chips W for the error as the teaching data to the artificial intelligence device 12a to allow the artificial intelligence device 12a to perform the learning. Therefore, the artificial intelligence device 12a can efficiently learn an image pattern for which accuracy of the determination of the chip determining device 12 is relatively low to intensively improve the accuracy of the determination of the chip determining device 12 for the image pattern. By repetition of the teaching and learning, the chip determining device 12 can accurately recognize the chips W bet by the player C in whatever state the chips W are piled up.

In addition, according to the present embodiment, the control device 14 grasps the actual total amount V0 of the chips W in the chip tray 23 when the retrieval of all the losing chips bet by each player C ends, calculates the necessary total amount V3 (=V1+V2) of the chips W in the chip tray 23 by adding the increased amount V2 of the chip tray 23 in the game calculated from the kinds and the numbers of the chips W bet by the losing player C to the total amount V1 of the chips W in the chip tray 23 before the settlement of each game on the basis of the determining result of the chip determining device 12, compares the necessary total amount V3 of the chips W in the chip tray 23 and the actual total amount V0 of the chips W in the chip tray 23 with each other, and determines that there is the doubt for the error in the determining result of the chip determining device 12 when there is the difference between the necessary total amount V3 and the actual total amount V0 (V3≠V0). As a result, it can be automatically determined by the control device 14 whether or not there is the doubt for the error in the determining result of the chip determining device 12.

In addition, according to the present embodiment, since the control device 14 grasps the actual total amount V0 of the chips W in the chip tray 23 based on the RFIDs provided in the chips W, the control device 14 can automatically grasp the actual total amount V0 of the chips W in the chip tray 23 using the RFIDs to improve measurement accuracy as compared with measurement performed with the naked eyes of the worker.

In addition, according to the present embodiment, since the game recording device 11 records the image acquired from the camera 212 after giving, to the image, the index or the time, or the tag specifying the retrieval scene or the payment scene of the chips, the chip determining device 12 can easily specify an image of a state of the chips W that should be analyzed from recorded contents of the game recording device 11 by using the index, the time, or the tag given to the image to shorten a time required for specifying the image.

In addition, according to the present embodiment, since the chip determining device 12 can determine the kinds, the numbers, and the positions of the bet chips W even when some of the plurality of the chips W put on the gaming table 4 are partially or entirely hidden due to the blind spot of the camera 212, particularly in the case where some of the plurality of the chips W put on the gaming table 4 are partially or entirely in the hidden state due to a blind spot of the worker, it is possible to improve the measurement accuracy as compared with the measurement performed with the naked eyes of the worker by allowing the chip determining device 12 to determine the chips W bet by the player C.

Note that various modifications can be made to the embodiment described above. Hereinafter, a modified example will be described with reference to the drawings. In the following description and the drawings used in the following description, the same reference numerals as those used for the corresponding components in the embodiment described above will be used for components that can be configured similarly to those of the embodiment described above, and an overlapping description will be omitted.

Figure 5:
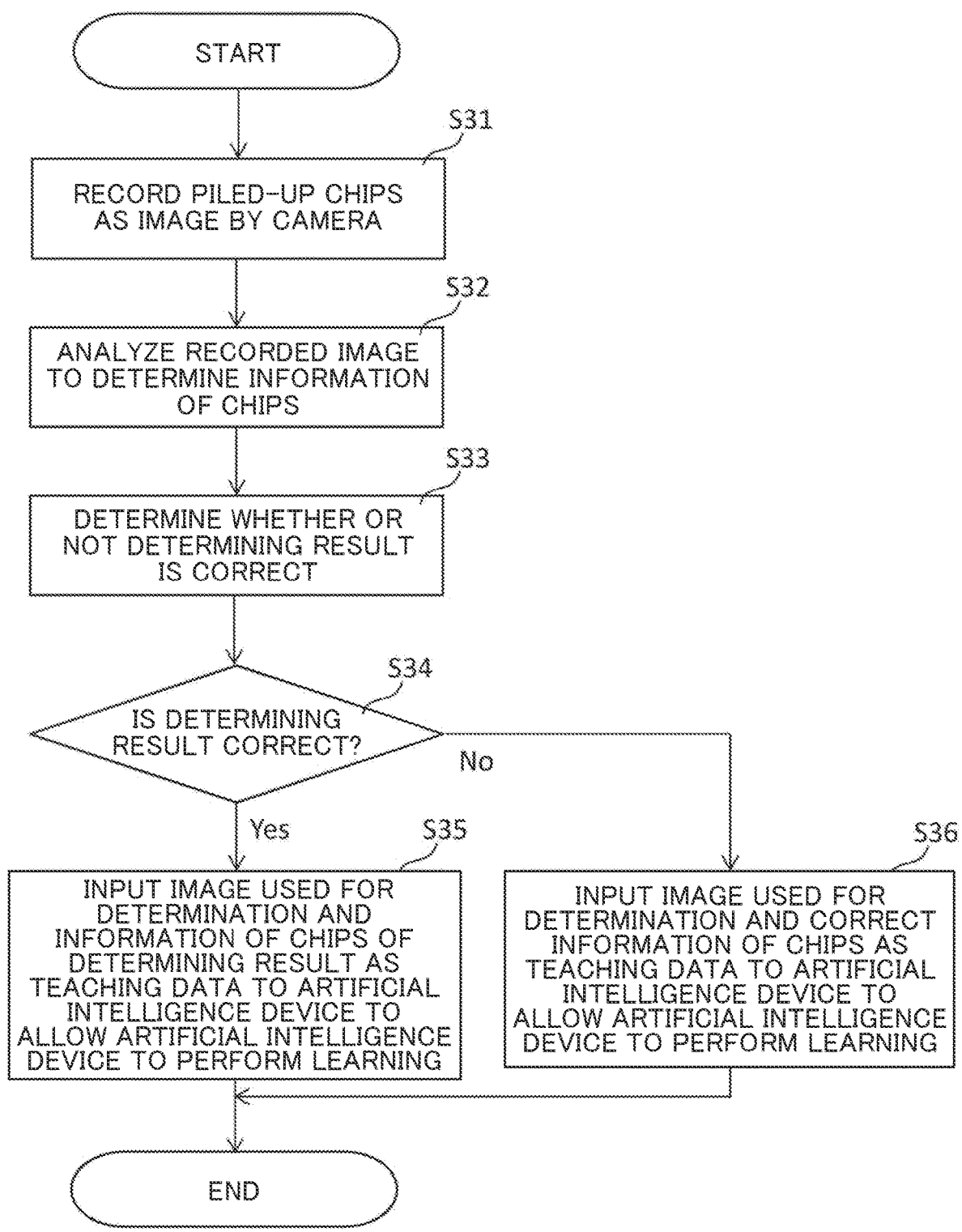
FIG. 5 is a flowchart for describing a modified example of the chip recognizing and learning method.

FIG. 5 is a flowchart for describing a modified example of the chip recognizing and learning method.

In the example illustrated in FIG. 5, in the case where it is determined by the control device 14 that there is the doubt for the error in the determining result of the chip determining device 12 (No in Step S34), the image used for the determination (including the doubt for the error) of the chip determining device 12 and the correct numbers and the correct kinds of the chips W for the error are input as the teaching data from the teaching device 13 to the artificial intelligence device 12a of the chip determining device 12, and the artificial intelligence device 12a performs the learning (Step S36).

On the other hand, in the case where it is determined by the control device 14 that the determining result of the chip determining device 12 is correct (Yes in Step S34), the image used for the (correct) determination of the chip determining device 12 and the numbers and the kinds of the chips W of the determining result of the chip determining device 12 (that is, the correct numbers and the correct kinds of the chips W) are input as the teaching data from the teaching device 13 to the artificial intelligence device 12a of the chip determining device 12, and the artificial intelligence device 12a further performs the learning (Step S35).

According to such an aspect, accuracy of the determination can be further improved for an image pattern for which accuracy of the determination of the chip determining device 12 is relatively high as well as an image pattern for which the accuracy of the determination of the chip determining device 12 is relatively low. Therefore, the chip determining device 12 can more accurately recognize the chips W bet by the player C.

Figure 6:
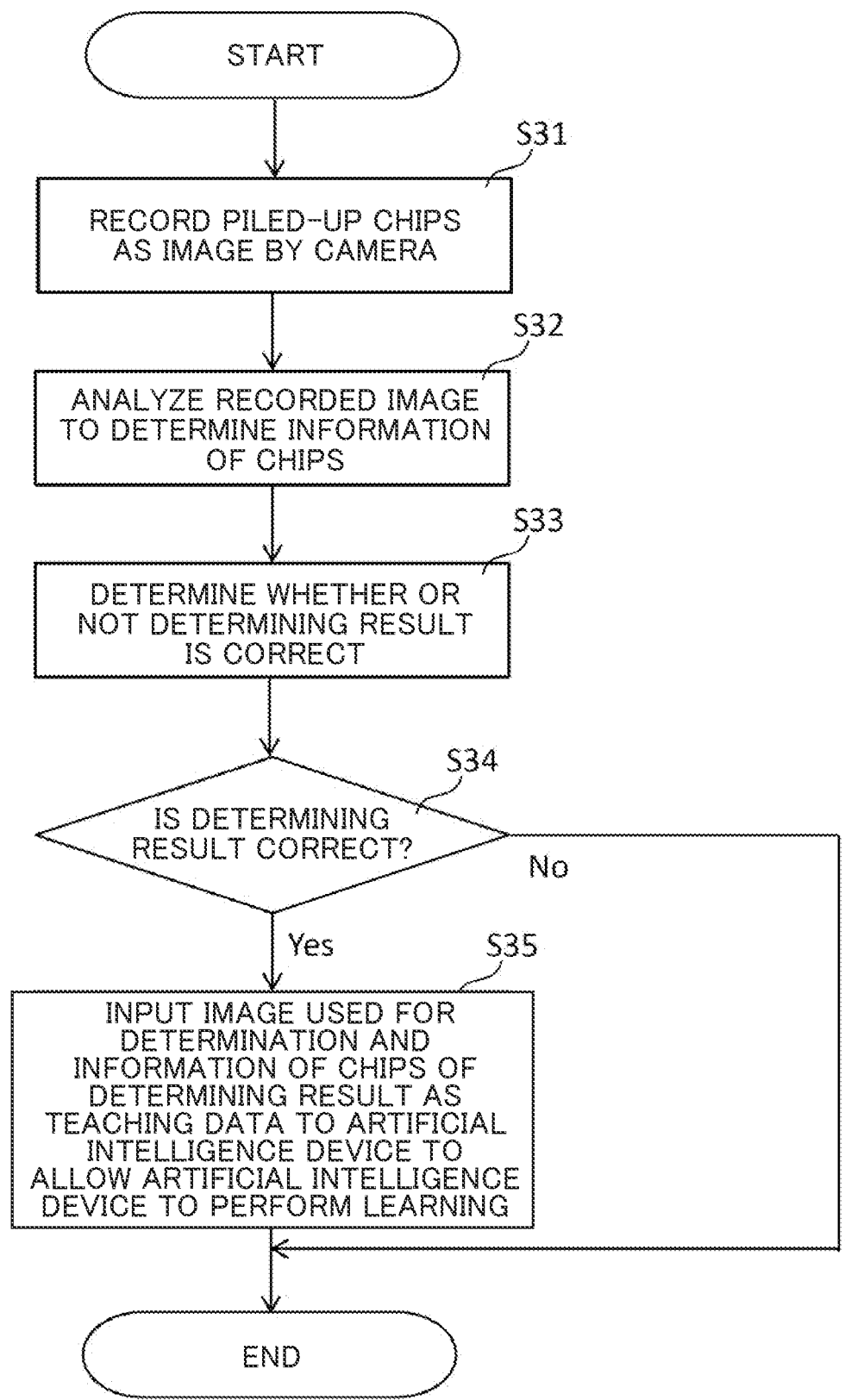
FIG. 6 is a flowchart for describing another modified example of the chip recognizing and learning method.

FIG. 6 is a flowchart for describing another modified example of the chip recognizing and learning method.

As illustrated in FIG. 6, in the case where it is determined by the control device 14 that the determining result of the chip determining device 12 is correct (Yes in Step S34), the image used for the (correct) determination of the chip determining device 12 and the numbers and the kinds of the chips W of the determining result of the chip determining device 12 (that is, the correct numbers and the correct kinds of the chips W) are further input as the teaching data from the teaching device 13 to the artificial intelligence device 12a of the chip determining device 12, and the artificial intelligence device 12a further performs the learning (Step S35).

On the other hand, in the case where it is determined by the control device 14 that there is the doubt for the error in the determining result of the chip determining device 12 (No in Step S34), the operation of the chip recognizing and learning system 10 in the game ends.

According to such an aspect, in the case where it is determined that the determining result of the chip determining device 12 is correct, the teaching device 13 inputs the image used for the determination of the chip determining device 12 and the (correct) numbers and the (correct) kinds of the chips W of the determining result as the teaching data to the artificial intelligence device 12a to allow the artificial intelligence device 12a to perform the learning. Therefore, the artificial intelligence device 12a can efficiently learn the image pattern for which accuracy of the determination of the chip determining device 12 is relatively high to intensively improve the accuracy of the determination of the chip determining device 12 for the image pattern. By repetition of the teaching and learning, the chip determining device 12 can accurately recognize the chips W bet by the player C.

Figure 7:
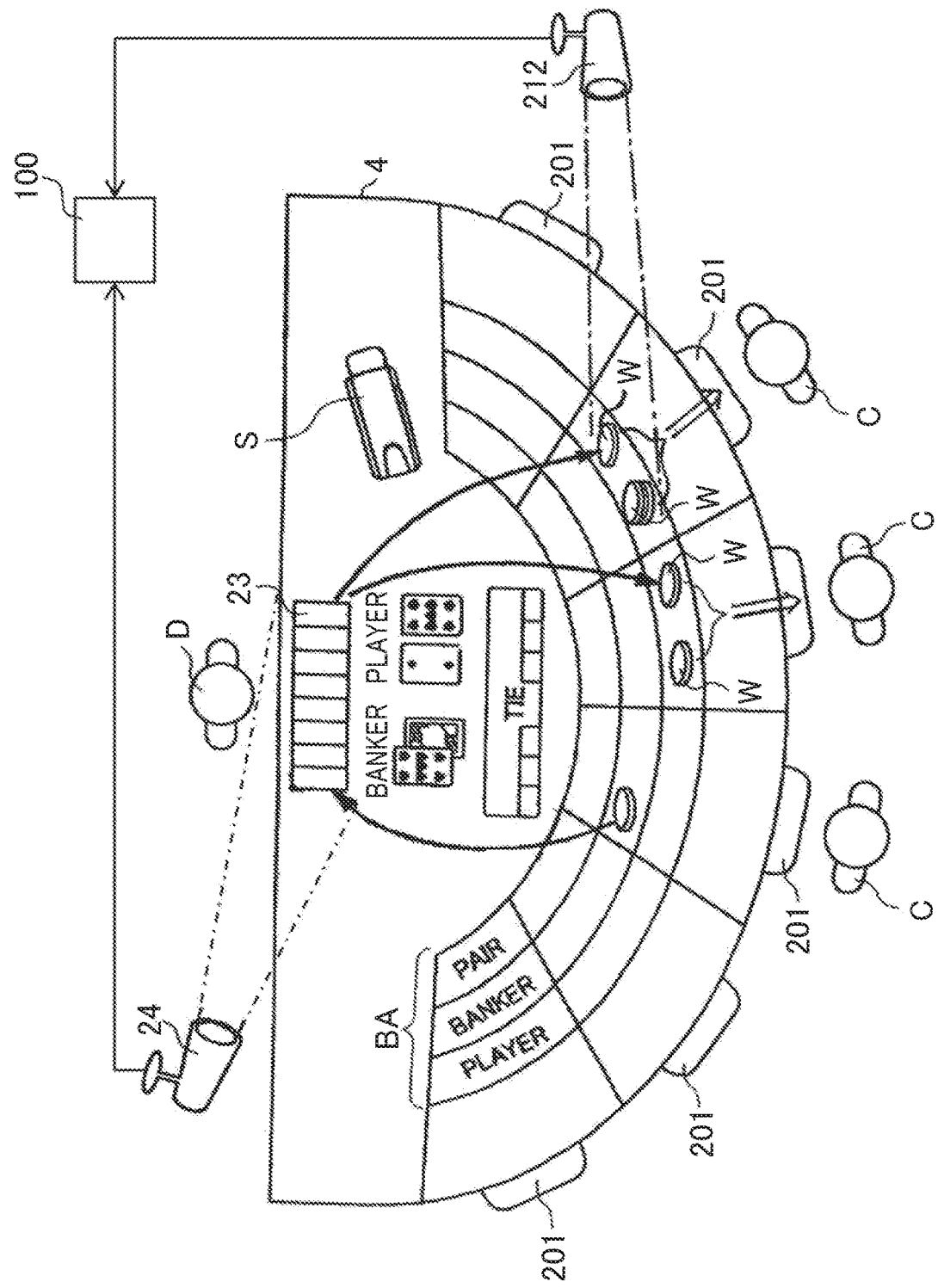
FIG. 7 is a diagram schematically illustrating an amusement place equipped with a chip recognizing and learning system according to a second embodiment.
Figure 8:
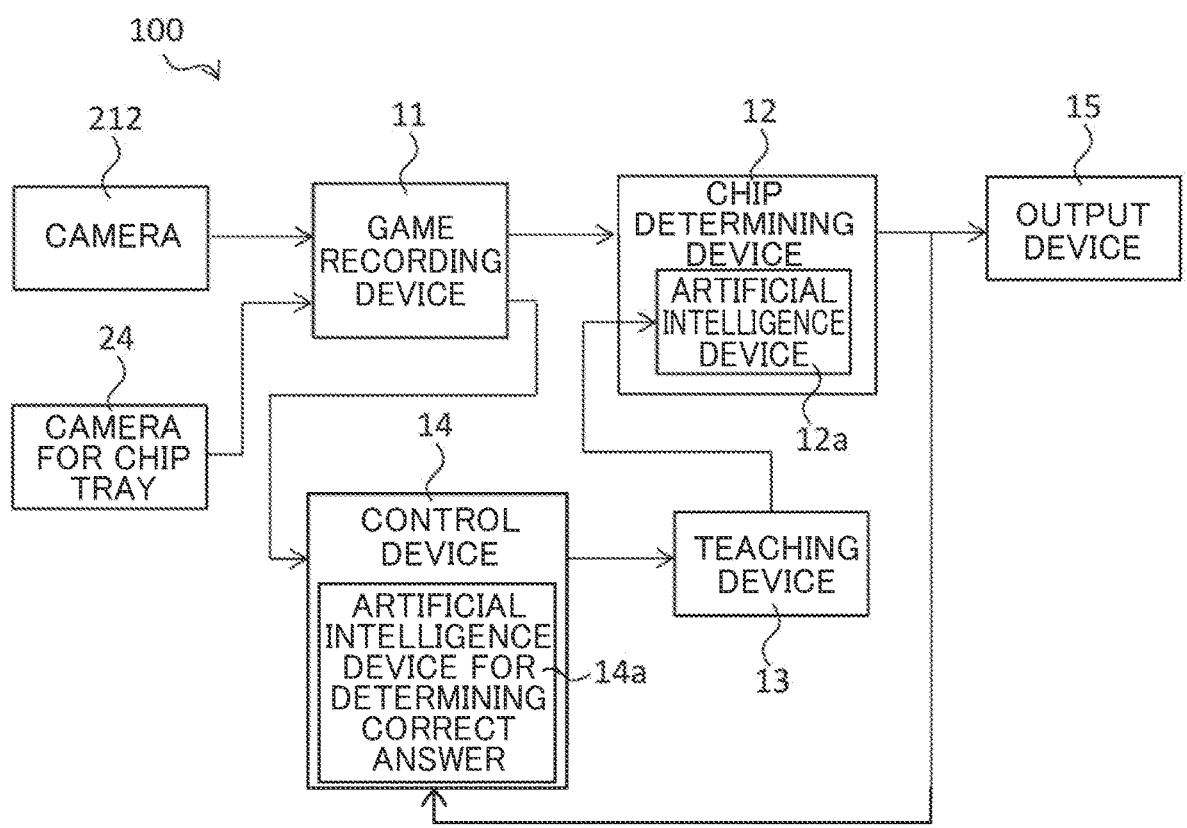
FIG. 8 is a block diagram illustrating a schematic configuration of the chip recognizing and learning system according to the second embodiment.

FIG. 7 is a diagram schematically illustrating an amusement place equipped with a chip recognizing and learning system 100 according to a second embodiment. FIG. 8 is a block diagram illustrating a schematic configuration of the chip recognizing and learning system 100 according to the second embodiment.

As illustrated in FIG. 7, in the second embodiment, in addition to a monitoring camera 212 capturing an image of a state of chips W disposed to be piled up in a bet area BA, a monitoring camera 24 for a chip tray capturing an image of a state of the chips W in a chip tray 23 managed by a dealer D is provided outside a gaming table 4.

The chip recognizing and learning system 100 according to the second embodiment is communicably connected to each of the monitoring camera 212 and the monitoring camera 24 for a chip tray.

As illustrated in FIG. 8, a game recording device 11 records the state of the chips W in the chip tray 23 as the image captured by the monitoring camera 24 for a chip tray. Note that the image may be a moving image or may be a continuous still image.

A control device 14 includes an artificial intelligence device 14a (artificial intelligence device for deciding a correct answer) which performs image recognition by, for example, a deep learning technique and is different from the artificial intelligence device 12a of the chip determining device 12, analyzes the image of the state of the chips W in the chip tray 23 recorded in the game recording device 11 to determine the numbers and kinds of the chips W in the chip tray 23, and grasp the actual total amount V0 of the chips Win the chip tray 23.

According to the second embodiment, the control device 14 can automatically grasp the actual total amount of the chips W in the chip tray 23 using the artificial intelligence device 14a for deciding a correct answer to improve measurement accuracy as compared with measurement performed with naked eyes of a worker.

Note that, in general, there is what is called non-teaching data learning, which teaches whether a result determined by artificial intelligence is correct or incorrect and is also considered as teaching data learning in the present invention.

The embodiments described above are described in order for those skilled in the art to which the present invention pertains to practice the present invention. Various modifications of the embodiments described above can be made by those skilled in the art, and a technical idea of the present invention can be applied to other embodiments. Accordingly, the present invention is not limited to the embodiments described above, but should be interpreted as the broadest scope according to a technical idea defined by the claims.

What is claimed:

1. A chip recognizing and learning system associated with an amusement place having a gaming table, the chip recognizing and learning system comprising:
    a camera configured to capture an image of multiple betting areas of the gaming table from above and at an angle so that the image includes a plurality of stacks of chips bet on the gaming table by a player, the multiple betting areas including a first betting area and a second betting area positioned between the first betting area and the camera; and
    at least one processor configured to:
        execute an artificial intelligence program to analyze the image of the chips in the plurality of stacks of chips on the gaming table to determine numbers and kinds of the chips;
        use, as new teaching data for the artificial intelligence program to learn, one or more images associated with an error in the determination of the numbers or the kinds of chips associated with the one or more images to thereby increase teaching data learned by the artificial intelligence program, the new teaching data further including correct numbers and correct kinds of chips associated with the one or more images, wherein the error is determined based on a chip tray change amount and the numbers or kinds of chips determined based on the image of the chips; and
        in response to the determined error:
            select the image; and
            provide the image to the artificial intelligence program.

2. The chip recognizing and learning system according to claim 1, wherein, in a case where it is determined that the numbers and kinds of chips are correct, the at least one processor is further configured to input one or more images used for the determination and the numbers and kinds of chips of the determination as teaching data to the artificial intelligence program to allow the artificial intelligence program to perform learning.

3. The chip recognizing and learning system according to claim 1, wherein the at least one processor is configured to:
    use the image to determine numbers and kinds of chips in a chip tray included in the gaming table and to perform the determination of the numbers and kinds of chips bet by the player and an identification of positions of the chips bet by the player respectively for each of a plurality of players in a game performed on the gaming table from the image;
    determine an actual total amount of the chips in the chip tray when retrieval of all losing chips bet by the players ends;
    calculate a necessary total amount of the chips in the chip tray by adding an increased amount of the chip tray in the game calculated from the numbers and kinds of the chips bet by a losing one of the players to the total amount of the chips in the chip tray before settlement of each game on the basis of the identification that is based on the image;
    compare the necessary total amount of the chips in the chip tray and the actual total amount of the chips in the chip tray with each other; and
    determine that there is the error when there is a difference between the necessary total amount and the actual total amount.

4. The chip recognizing and learning system according to claim 3, wherein the at least one processor is configured to determine the actual total amount of the chips in the chip tray based on radio frequency identifications (RFIDs) provided in the chips.

5. The chip recognizing and learning system according to claim 3, wherein the at least one processor is configured to use, for the calculation of the necessary total amount, including determining the actual total amount of the chips in the chip tray from the image, an artificial intelligence that is different from the artificial intelligence program that is executed to determine the numbers and kinds of the chips bet by the player.

6. The chip recognizing and learning system according to claim 3, wherein the at least one processor is configured to record the image acquired from the camera after giving to the image an index, a time, or a tag specifying a retrieval scene or a payment scene of the chips by which a record of the game can be analyzed.

7. The chip recognizing and learning system according to claim 1, wherein the at least one processor is configured to determine the kinds, the numbers, and positions of the bet chips even when some of a plurality of chips put on the gaming table are partially or entirely hidden due to a blind spot of the camera.

8. The chip recognizing and learning system according to claim 1, wherein:

the plurality of chip stacks include a first chip stack positioned in the first betting area and a second chip stack positioned in the second betting area; and the camera is positioned above a top chip of the first chip stack and above a top chip of the second chip stack.

9. The chip recognizing and learning system according to claim 1, wherein a first set of betting areas of the multiple betting areas correspond to a first player position at the gaming table, the first set of betting areas arranged on the gaming table in series between the first player position and a dealer position at the gaming table.

10. The chip recognizing and learning system according to claim 1, wherein the camera configured to capture the image from above and at the angle, is configured to capture the image so that the image includes a top surface of a top chip of at least one stack of the plurality of stacks.

11. The chip recognizing and learning system according to claim 1, wherein the at least one processor is further configured to, for each stack of the plurality of stacks, determine which betting area of the multiple betting areas includes the stack.

12. The chip recognizing and learning system according to claim 1, wherein:
the camera is distinct from the gaming table and mounted above the gaming table such that the camera is not mounted on gaming table; and
each first betting area and the second beating area corresponds to the same player.

13. The chip recognizing and learning system according to claim 1, wherein:
the camera is configured to capture multiple images of the multiple betting areas of the gaming table from above and at an angle; and
the at least one processor is configured to:
tag the image with a first tag indicating a payment scene associated with settlement of one or more chips associated with one or more winning wagers, wherein the image is captured prior to the settlement of the one or more chips associated with the one or more winning wagers;
determine a first amount associated with a chip tray of the gaming table prior to the settlement of the one or more chips associated with the one or more winning wagers;
after the settlement of the one or more chips associated with the one or more winning wagers, determine a second amount associated with the chip tray after the settlement of the one or more chips associated with the one or more winning wagers;
determine a first chip tray change amount based on the first amount and the second amount;
determine the error based on the first chip tray change amount and the numbers or kinds of chips determined based on the image of the chips; and
in response to the determined error:
select the image based on the first tag; and
provide the image to the artificial intelligence program.

14. The chip recognizing and learning system according to claim 13, wherein the chip tray change amount is based on:
a first amount associated with a chip tray of the gaming table prior to collection of one or more chips associated with one or more lost wagers, and
a second amount associated with the chip tray after the collection of the one or more chips associated with the one or more lost wagers.

15. The chip recognizing and learning system according to claim 1, wherein:
the camera is configured to capture multiple images of the multiple betting areas of the gaming table from above and at an angle; and
the at least one processor is configured to:
tag the image with a first tag indicating a retrieval scene associated with collection of one or more chips associated with one or more lost wagers, wherein the image is captured prior to the collection of the one or more chips associated with the one or more lost wagers;
determine a first amount associated with a chip tray of the gaming table prior to the collection of the one or more chips associated with the one or more lost wagers;
after the collection of the one or more chips associated with the one or more lost wagers, determine a second amount associated with the chip tray after the collection of the one or more chips associated with the one or more lost wagers;
determine a first chip tray change amount based on the first amount and the second amount;
determine the error based on the first chip tray change amount and the numbers or kinds of chips determined based on the image of the chips; and
in response to the determined error:
select the image based on the first tag; and
provide the image to the artificial intelligence program.

16. The chip recognizing and learning system according to claim 15, wherein the at least one processor is configured to:
tag a second image of the multiple images with a second tag indicating a payment scene associated with settlement of one or more chips associated with one or more winning wagers, wherein the second image is captured prior to the settlement of the one or more chips associated with the one or more winning wagers;
after the settlement of the one or more chips associated with the one or more winning wagers, determine a third amount associated with the chip tray after the settlement of the one or more chips associated with the one or more winning wagers;
determine a second chip tray change amount based on the second amount and the third amount;
determine another error based on the second chip tray change amount and based on the numbers or kinds of chips determined based on the image of the chips, the second image, or a combination thereof; and
in response to the determined another error:
select the second image based on the second tag; and
provide the second image to the artificial intelligence program.

17. The chip recognizing and learning system according to claim 15, wherein the chip tray is positioned between the camera and a dealer position at the gaming table.

18. The chip recognizing and learning system according to claim 15, wherein the at least one processor is configured to:
tag the image with a tag indicating a retrieval scene associated with the collection of one or more chips associated with one or more lost wagers, the image is captured prior to the collection of the one or more chips associated with the one or more lost wagers; and
select the image based on the tag.

19. A chip recognizing and learning method in an amusement place having a gaming table, comprising:

executing an artificial intelligence program to analyze an image, obtained from a camera, of chips piled up on the gaming table to determine numbers and kinds of chips bet by a player, wherein the camera is configured to capture an image of multiple betting areas of the gaming table from above at an angle so that the image includes a plurality of stacks of the chips piled up on the gaming table, the multiple betting areas including a first betting area and a second betting area positioned between the first betting area and the camera;

using, as new teaching data for the artificial intelligence program to learn, one or more images associated with an error in the determination of the numbers or the kinds of chips associated with the one or more images to thereby increase teaching data learned by the artificial intelligence program, the new teaching data teaching data further including correct numbers and correct kinds of chips associated with the one or more images, wherein the error is determined based on a chip tray change amount and the numbers or kinds of chips determined based on the image of the chips; and in response to the determined error:
selecting the image; and
providing the image to the artificial intelligence program.

* * * * *